(12) United States Patent
Frohnmayer et al.

(10) Patent No.: US 10,164,235 B2
(45) Date of Patent: Dec. 25, 2018

(54) BATTERY ASSEMBLY INCLUDING MULTI-ROW BATTERY INTERCONNECTION MEMBER

(71) Applicant: ARCIMOTO, INC., Eugene, OR (US)

(72) Inventors: Mark Douglas Frohnmayer, Eugene, OR (US); James Kevin Jordan, Eugene, OR (US); Terry Leon Becker, Eugene, OR (US)

(73) Assignee: ARCIMOTO, INC., Eugene, OR (US)

( * ) Notice: Subject to any disclaimer, the term of this patent is extended or adjusted under 35 U.S.C. 154(b) by 286 days.

(21) Appl. No.: 14/960,289

(22) Filed: Dec. 4, 2015

(65) Prior Publication Data

US 2016/0156011 A1 Jun. 2, 2016

Related U.S. Application Data

(63) Continuation-in-part of application No. 14/268,236, filed on May 2, 2014.

(60) Provisional application No. 61/877,196, filed on Sep. 12, 2013, provisional application No. 61/818,682, filed on May 2, 2013, provisional application No. 62/087,680, filed on Dec. 4, 2014.

(51) Int. Cl.
*H01M 2/20* (2006.01)
*H01M 2/10* (2006.01)
*H01M 10/42* (2006.01)
*H01M 10/48* (2006.01)

(52) U.S. Cl.
CPC ......... *H01M 2/202* (2013.01); *H01M 2/1016* (2013.01); *H01M 10/425* (2013.01); *H01M 10/486* (2013.01); *H01M 2200/00* (2013.01)

(58) Field of Classification Search
CPC .................................. H01M 2/20; H01M 2/30
See application file for complete search history.

(56) References Cited

U.S. PATENT DOCUMENTS 4,091,186 A 5/1978 Ott
6,117,584 A 9/2000 Hoffman
(Continued)

OTHER PUBLICATIONS

USPTO, "Office Action", Office correspondence and search information in co-pending U.S. Appl. No. 14/268,236, dated Mar. 23, 2016, 18 pages.
(Continued)

*Primary Examiner* — James Lee
(74) *Attorney, Agent, or Firm* — Alleman Hall Creasman & Tuttle LLP

(57) ABSTRACT

The present disclosure is directed toward apparatuses for packaging one or more cells in a larger battery pack, and apparatuses for electrically coupling a battery management system to the one or more cells in a battery pack. In the aspect of the present disclosure directed toward a battery packaging apparatus with integrated spring contacts, an electrically conductive element has first and second surface a, with the first surface electrically coupled to a first battery, and a first spring-like element that is coupled to the first face of the electrically conductive element. The electrically conductive element has a cross section such that the second surface contacts the spring-like element in first and second areas. The spring-like element is operable for providing a force on the electrically conductive element when the first area is translocated toward the second area.

14 Claims, 13 Drawing Sheets

(56) References Cited

U.S. PATENT DOCUMENTS

| | | |
|---|---|---|
| 8,426,063 B2 | 4/2013 | Sheau-Pyng |
| 9,184,430 B2 | 11/2015 | Kalman |
| 2007/0285052 A1 | 12/2007 | Jeon |
| 2009/0239130 A1 | 9/2009 | Culver |
| 2012/0121966 A1 | 5/2012 | Kim |
| 2012/0263979 A1* | 10/2012 | Jensen .................. H01M 2/105 429/50 |
| 2012/0321936 A1* | 12/2012 | Song ..................... H01M 2/105 429/159 |

OTHER PUBLICATIONS

Arcimoto, Inc., "Response to Office Action", Applicant correspondence with Office in co-pending U.S. Appl. No. 14/268,236, dated Jun. 14, 2016, 10 pages.

USPTO, "Office Action", Office correspondence and search information in co-pending U.S. Appl. No. 14/268,236, dated Sep. 15, 2016, 17 pages.

* cited by examiner

BATTERY ASSEMBLY INCLUDING MULTI-ROW BATTERY INTERCONNECTION MEMBER

CROSS-REFERENCE TO RELATED APPLICATIONS

The present application is a continuation-in-part application that claims the benefit of and priority to U.S. nonprovisional application Ser. No. 14/268,236, titled "Battery Pack Design For Integrating And Monitoring Multiple Single Battery Cells", filed May 2, 2014, which claims the benefit of and priority to U.S. provisional application Ser. No. 61/877,196, titled "Battery Pack For Integrating Multiple Single Battery Cells And A Battery Management System", filed Sep. 12, 2013 and U.S. provisional application Ser. No 61/818,682, titled "Battery Cell With Integrated Spring Contacts", filed May 2, 2013. The present application is also a non-provisional application that claims the benefit of and priority to U.S. provisional application 62/087,680, titled "Battery Matrix Interconnection And Cooling System", filed Dec. 4, 2014. The entire contents of each of these priority applications are incorporated herein by reference in their entirety for all purposes.

FIELD

The present disclosure is directed to the field of electronics and pertains particularly to integrating multiple battery cells and a battery management system to form a battery pack.

BACKGROUND

Electric vehicles and other electronic systems utilize energy storage devices often in the form of electric batteries. Lithium-ion batteries are an example of a rechargeable electric battery that is commonly used within automotive applications. Charging and discharging of electric batteries may generate heat. Excessive heat generated by or applied to electric batteries, or excessive temperature conditions, may result in reduced battery efficiency or power delivery capability, and may damage the electric batteries or other surrounding components.

SUMMARY

One aspect of the present disclosure includes a battery packaging apparatus with integrated spring contacts comprised of an electrically conductive element that has a first and second surface, with the first surface electrically coupled to a first battery, and a first spring-like element that is coupled to the first face of the electrically conductive element. The electrically conductive element has a cross section such that the second surface contacts the spring-like element in two areas; a first and second area. The spring-like element is operable for providing a force on the electrically conductive element when the first area is translocated toward the second area.

Another aspect of the present disclosure includes an attachment apparatus for a battery management system comprising a planar conduction medium that is electrically coupled to at least one battery, a first electrically conductive trace with a first and second leg wherein the first leg is substantially perpendicular to the second leg, and the first leg is electrically coupled to the first planar conduction medium, and a connector for coupling the second leg of the first electrical trace to a battery management system.

Still another aspect of the present disclosure includes an attachment apparatus for a battery management system comprising a planar conduction medium that is electrically coupled to at least one battery, a first electrically conductive trace that extends from the first planar conduction medium wherein the electrically conductive trace is electrically coupled to the first planar conduction medium and the electric coupling between the first planar conduction medium and the electrically conductive trace is maintained by friction between the first planar conduction medium and a substantially parallel nonconductive surface, and a connector for coupling the first electrical trace to a battery management system.

DETAILED DESCRIPTION

Figure 1:
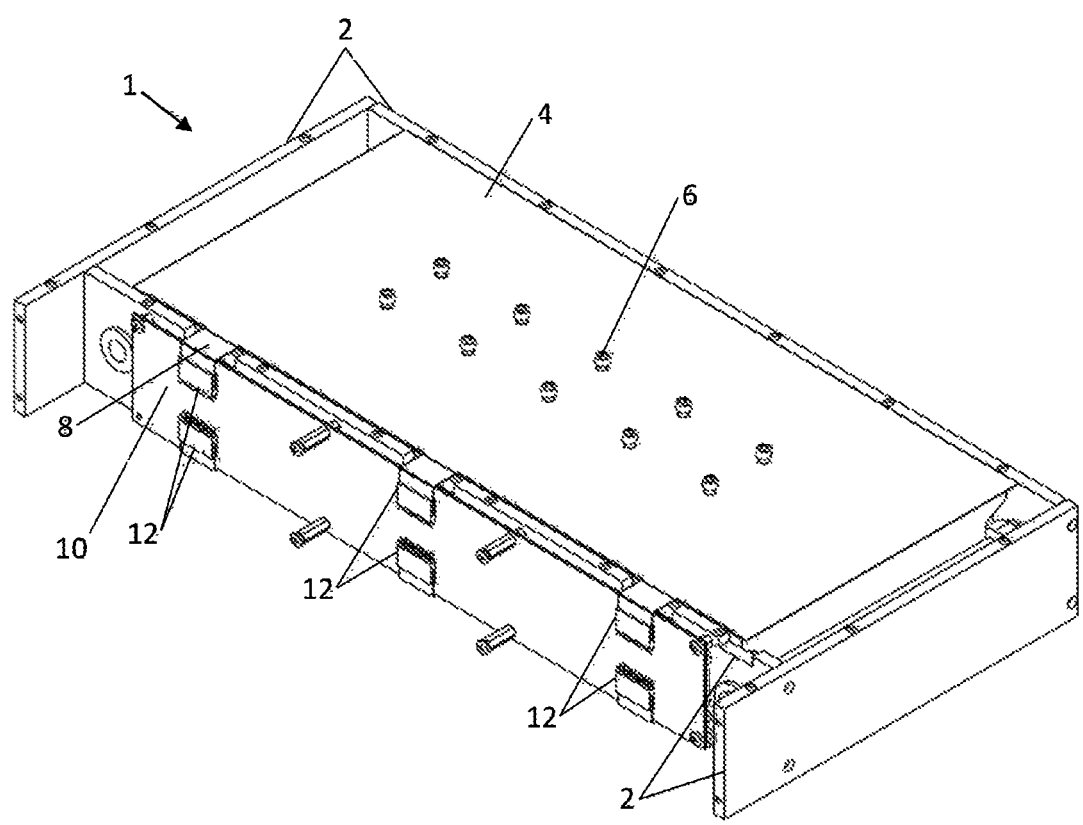
FIG. 1 depicts an example battery pack constructed according to aspects of the present disclosure.

In the field of electronics, newer lithium-based batteries have been developed that have much higher energy density ratings than previous generation technologies such as Nickel Cadmium or Nickel Metal Hydride. These lithium batteries require management to preserve battery longevity and safety. Characteristics managed include over current, over voltage and under voltage conditions. A battery pack may comprise one or more battery cells of a given battery chemistry.

For example, an 18650-sized lithium ion battery cell may have a 3.6 volt potential and 2.0 amp hour capacity. In order to build a pack of higher voltage and higher capacity, multiple groups of parallel-connected battery cells may be connected in series. A 50.4 volt battery pack with 10 amp hour capacity could be constructed by connecting in series 14 parallel-connected groups of 5 of the afore mentioned battery cells.

A conventional means for integrating multiple battery cells by direct coupling of the battery terminals of multiple battery cells to each other via a spot-welded conductor of nickel metal creates safety issues during pack assembly and maintenance, and long term wear issues from wires connecting from the intermediate conductor to a battery management system. This traditional method may also require a larger investment in production equipment. For example, Kalman (US Pat. App. 2012/0148877 A1) describes using parallel printed circuit boards (PCB) to conduct current between multiple battery cells positioned by two positioning plates and forming a contact via a loosely-coupled intermediate conductive component. In a high power application, inconsistent impedance in the intermediate conductive component can cause battery cells to age at different rates, and because printed circuit boards have poor thermal transfer through the outer, current-insulating layer, battery cells may overheat.

Further, embedding the battery management components into the same circuit boards that carry pack current between groups of cells may introduce additional complexity, layering and cost in the PCB manufacturing process, and packs that are too large to fit within the bounds of a single printed circuit board may require costly interconnects between sub modules.

Additionally, while the nominal dimensions of an individual cell may be the same, in practice the dimensions of individual cells in a battery may vary. A particular problem in larger collections of cells is ensuring the even flow of current and heat from the terminals of the battery. Differing actual dimensions further exacerbates this problem.

In practice, terminals may be soldered or welded to a shared conductive medium, however such connections may require expensive tooling for production, or they may fatigue in a high vibration environment. Terminals may also be electrically connected to a shared conductive medium via an intermediate conductive component such as a spring that provides sufficient force to preserve electrical connection. Springs may not, however, have the thermal and/or electrical conductivity sufficient for a particular application or may be expensive to manufacture or assemble. US Pat. App. 2012/0148877 A1 discloses a battery pack made up of cells held in tension between two conductive media via an intermediate conductive component which is a spring made from a conductive material or a compressible clip, or shim, made of spring steel. In both cases, such springs may have dissimilar impedance, require the medium that conducts current to also provide spring force, and add extra parts and manufacturing cost to a battery pack assembly.

Therefore, what is clearly needed is a complete solution that offers the ability to monitor cell charge states with a battery management system while accommodating the variation in the actual size of cells.

One aspect of the present disclosure includes a battery packaging apparatus with integrated spring contacts comprised of an electrically conductive element that has a first and second surface, with the first surface electrically coupled to a first battery, and a first spring-like element that is coupled to the first face of the electrically conductive element. The electrically conductive element has a cross section such that the second surface contacts the spring-like element in two areas; a first and second area. The spring-like element is operable for providing a force on the electrically conductive element when the first area is translocated toward the second area.

Another aspect of the present disclosure includes an attachment apparatus for a battery management system comprising a planar conduction medium that is electrically coupled to at least one battery, a first electrically conductive trace with a first and second leg wherein the first leg is substantially perpendicular to the second leg, and the first leg is electrically coupled to the first planar conduction medium, and a connector for coupling the second leg of the first electrical trace to a battery management system.

Still another aspect of the present disclosure includes an attachment apparatus for a battery management system comprising a planar conduction medium that is electrically coupled to at least one battery, a first electrically conductive trace that extends from the first planar conduction medium wherein the electrically conductive trace is electrically coupled to the first planar conduction medium and the electric coupling between the first planar conduction medium and the electrically conductive trace is maintained by friction between the first planar conduction medium and a substantially parallel nonconductive surface, and a connector for coupling the first electrical trace to a battery management system.

Referring to FIG. 1, a battery pack 1 is shown that is constructed according to one embodiment of the present disclosure. The battery pack 1 is comprised of a housing 2, a non-conductive board element 4, a plurality of compression fasteners 6, a battery management system 10, and a plurality of connectors 12 which connect a flexible PCB 8 with traces 9 to the battery management system 10.

Figure 2:
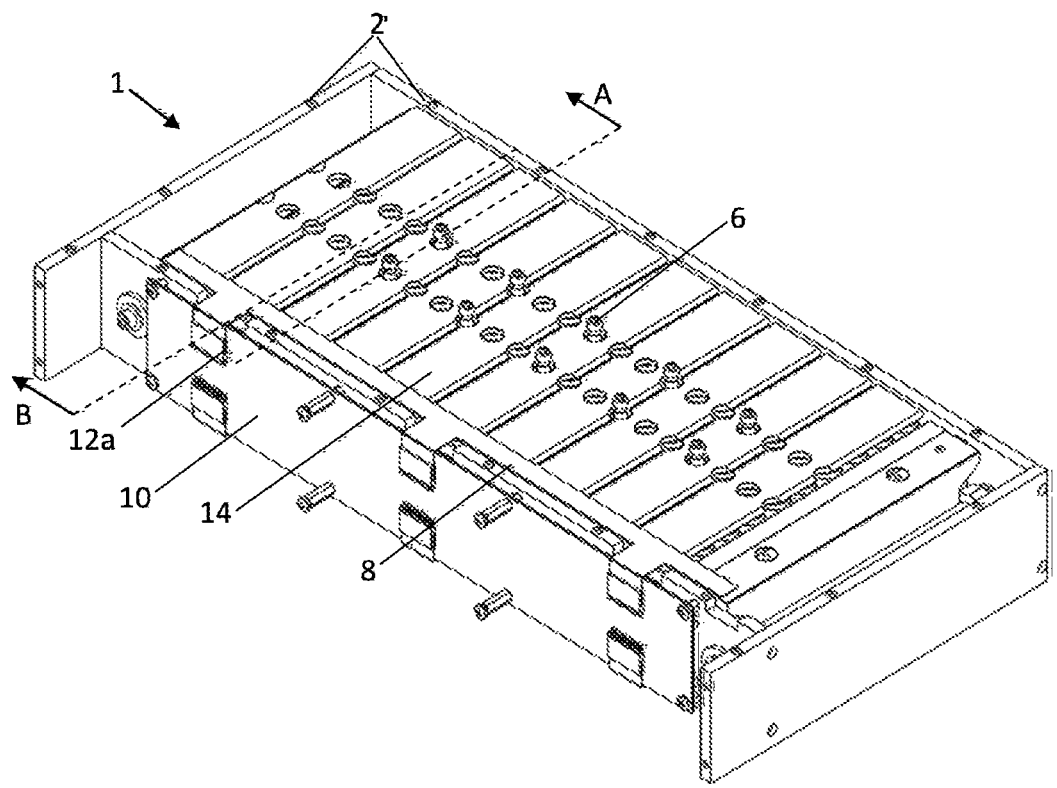
FIG. 2 depicts the battery pack of FIG. 1 with features removed to facilitate understanding.

FIG. 2 depicts the embodiment of a battery pack 1 as shown in FIG. 1 without a non-conductive board element 4. In FIG. 2, with the removal of the non-conductive board element 4 the plurality of electrically conductive elements 14 are now visible. Additionally, it is possible to see the flexible PCB 8 with traces 9 (not shown in FIG. 2), which rests on top of the electrically conductive elements 14 and below the non-conductive board element 4. Further, FIG. 1 shows two section lines, A and B which run through the center line of two compression fasteners 6 and the edge of a connector 12a, respectively.

Figure 3:
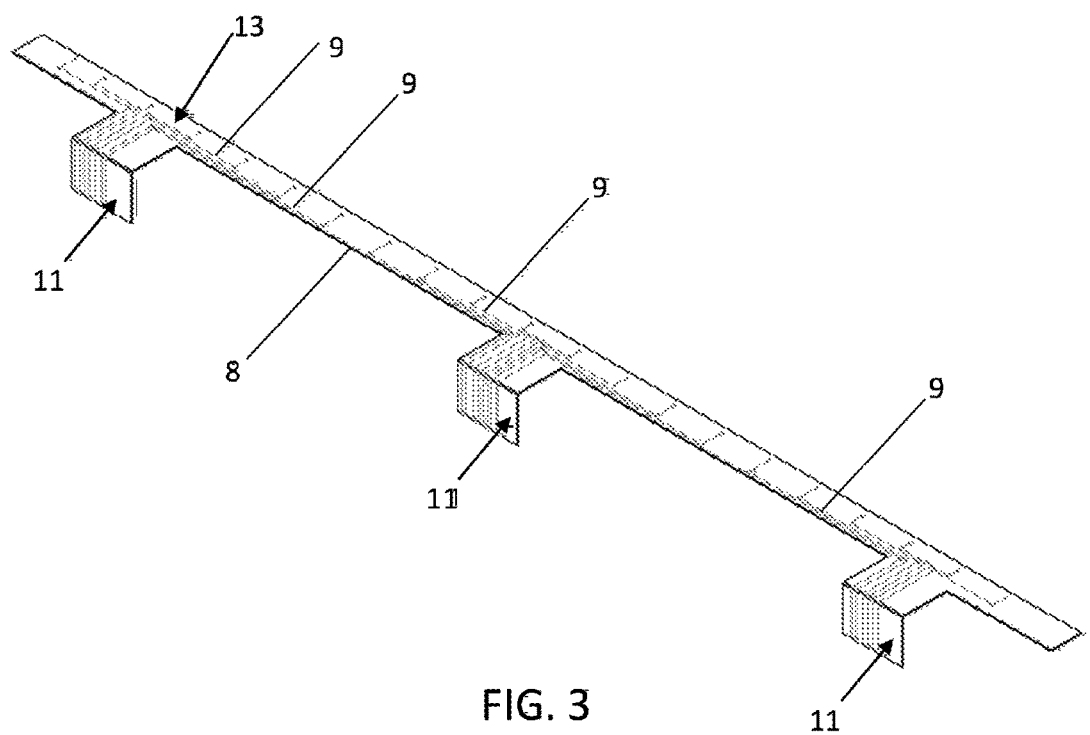
FIG. 3 depicts a flexible PCB constructed according to aspects of the present disclosure.

Referring to FIG. 3 in more detail, FIG. 3 depicts an embodiment of the traces 9 as taught by the present disclosure. In the embodiment shown in FIG. 3, a plurality of traces 9 are located on a flexible PCB 8. The flexible PCB 8 has a first face 13 and a second face 11. The first face 13 and second face 11 are substantially perpendicular in the depicted embodiment. However, in other embodiments the first face 13 and second face 11 may be oriented at any angle relative to one another including being co-planar.

The plurality of traces 9 are operable for conducting electricity from one end to another. Thus any electrically conductive material is suitable for use as a trace, including copper, brass, and steel. Although the embodiment shown in FIG. 3 has each trace 9 as a trace on a single PCB board 8, each trace could alternatively be a wire or a strip of conductive material. Further, each individual trace 9 need not be mounted on the same surface as the other traces 9 as shown in FIG. 3.

Figure 4:
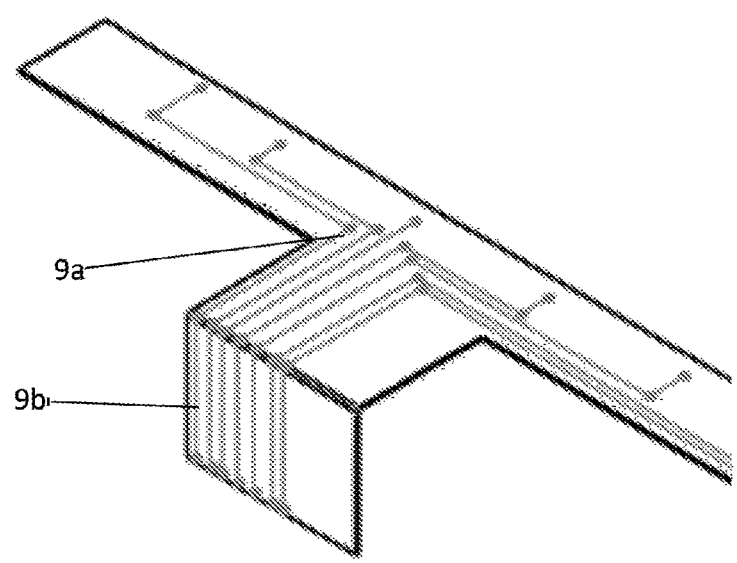
FIG. 4 is a detail view of the flexible PCB constructed according to aspects of the present disclosure as shown in FIG. 3.

FIG. 4. depicts the embodiment of the traces 9 as shown in FIG. 3 in more detail. In FIG. 4, the first leg 9a and second leg 9b of an individual trace 9 are shown. The first leg 9a includes the entirety of the trace 9 located on the first face 13 of the PCB 8, and the second leg 9b includes the entirety of the trace 9 located on the second face 11 of the PCB 8. In the embodiment shown in FIG. 4 the first leg 9a and the second leg 9b form two planes that are substantially perpendicular. However, in alternative embodiments, the first leg 9a and second leg 9b of a trace 9 may be oriented at any angle relative to one another, including co-planer.

Figure 5:
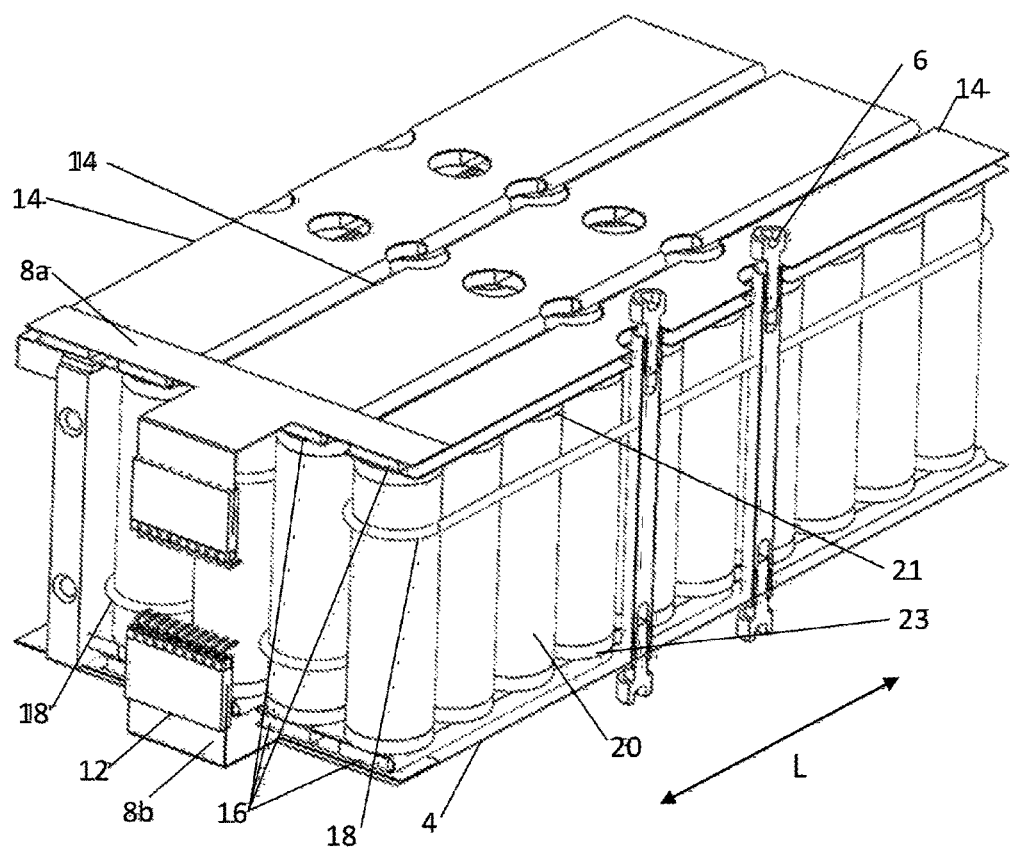
FIG. 5 is a cross section view of the embodiment shown in FIG. 1.

FIG. 5 depicts a section view of the battery pack 1 shown in FIG. 2 taken at section A. The housing 2 and battery management system 10 are not shown, for clarity. In FIG. 5 the plurality of cells 20 are visible. The cells 20 are standard cylindrical lithium ion cells. However, in alternative embodiments, the cells may be a prismatic or pouch type lithium ion cell. Alternatively, the cells may be of any other chemistry as a particular application would require.

The cells 20 are located in rows oriented in direction L. The cells in a particular row are bound by bands 18 that are located circumferentially around the one or more cells 20 in a particular row. In embodiments with a single cell in each row, the band 18 is tight fit around the circumference of that particular cell, whereas in embodiments where there are a plurality of cells 20 located in a row, the band 18 is located circumferentially around all of the cells 20 in that row, as shown in FIG. 5. The band 18 serves to provide a discrete spacing distance between adjacent rows of cells. One benefit of discrete spacing between adjacent rows of cells is that a thermal runaway event in one cell will not cause a cascading chain reaction in adjacent cells. The band may be an O-ring or a strap or other configuration, which is capable of creating a discrete spacing between adjacent rows of cells. The band may be made out of plastic, rubber, silicone, or any other material suitable for providing a discrete spacing between adjacent rows of cells.

Each cell 20 has a second terminal 21 and a first terminal 23. The first terminal 23 and second terminal 21 are electrically coupled to different electrically conductive elements 14. In the embodiment shown in FIG. 5, the first terminal 23 is electrically coupled to an electrically conductive element 14 by spot welding. The second terminal 21 is electrically coupled to an electrically conductive element 14 via a metal strip 22 (not visible in FIG. 5) which is spot welded to the second terminal 23 and which then rests upon the electrically conductive element 14. In each row, the orientation of the cells is opposite the previous row such that the terminals in the same plane of the battery pack 1 alternate positive, negative, positive, and onward in this pattern in the long direction of the flexible PCB 8. In a particular row extending perpendicular to the flexible PCB 8, the terminals share a polarity.

There are two flexible PCB's 8a, 8b (traces 9 not shown for clarity) depicted in FIG. 5. The top PCB 8a and traces 9 (not shown for clarity) are electrically coupled to the plurality of electrically conductive members 14 by being in contact with the electrically conductive members 14. The bottom PCB 8b and traces 9 (not shown for clarity) are located between a plurality of electrically conductive members 14 and a non-conductive board element 4. The electric coupling between the bottom PCB 8a and the plurality of electrically conductive elements 14 is enhanced by a pressure applied on the bottom PCB 8b and the traces 9 (not shown for clarity). The pressure is applied by tightening the compression fasteners 6 and forcing the non-conductive board element 4 against the plurality of electrically conductive members 14. This pressure serves to secure the PCB 8b and traces 9 (not shown for clarity) in the location where they are electrically coupled to the plurality of electrically conductive members 14. In various other embodiments, there may be additional layers between the non-conductive board element 4 and the electrically conductive members 14. For example a thermal interface material may be located between the non-conductive board element 4 and the electrically conductive members 14 in order to maximize the heat transfer though the electrically conductive element 14 and into the electrically non-conductive board element 14.

Figure 6:
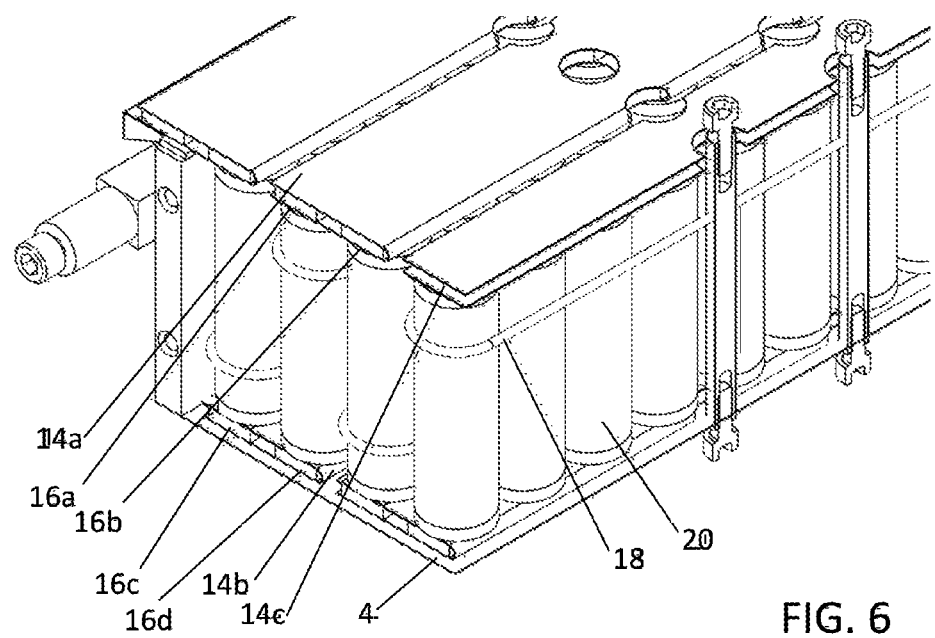
FIG. 6 is a detail view of the cross section view of the embodiment shown in FIG. 5.

In FIG. 6, the embodiment shown in FIG. 5 is shown with the connectors 12 and PCB's 8 removed. The plurality of spring elements 16a,16b,16c,16d are visible. Top electrically conductive members 14a,14c and a bottom electrically conductive member 14b are shown.

Figure 7:
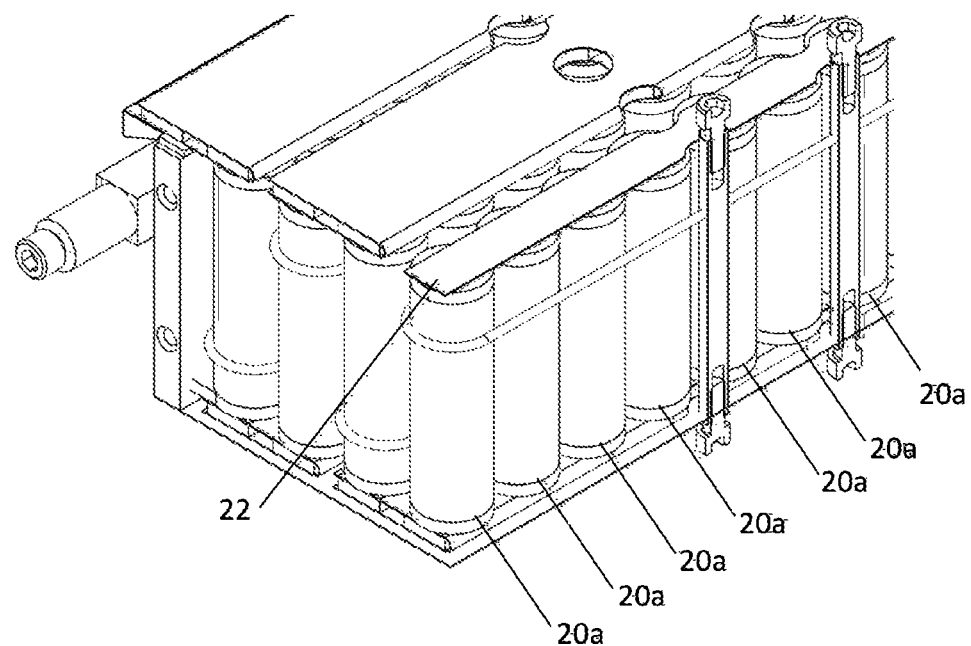
FIG. 7 is a detail view of the cross section view of the embodiment shown in FIG. 6.

FIG. 7 depicts the embodiment shown in FIG. 6 with one of the top electrically conductive members 14c removed. A conductive strip 22 is now visible. The conductive strip 22 may be made out of any electrically conductive material and operates to ensure that all the cells in a row 20a are at the same potential. The conductive strip 22 is preferably spot welded to the cells in a row 20a, however, the strip may be attached in any way including adhesives, or stamped recesses in the conductive strip 22 that are sized to fit the cell 20a terminals. Using a conductive strip 22 creates a larger contact area, than just cell terminals, between the attached cell terminals and the electrically conductive member 14. As a result of a larger contact area less pressure is needed to create consistent impedance between rows of cells electrically connected via the electrically conductive member. Also, a larger contact area reduces the pressure that is exerted on the safety blowout valve located at the top of each cell.

Figure 8:
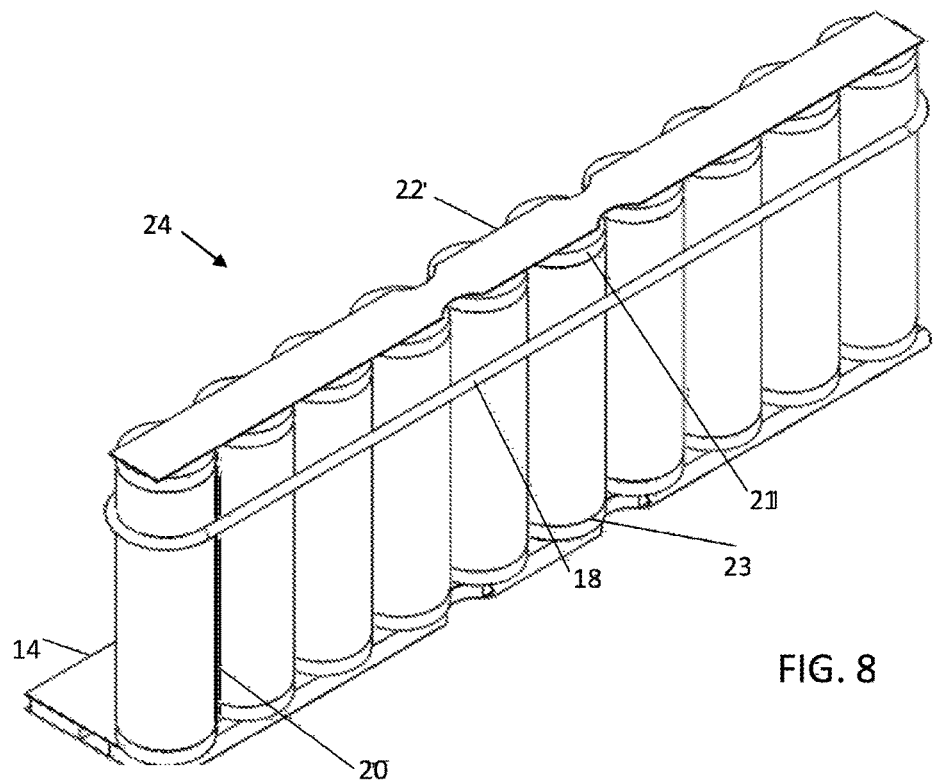
FIG. 8 depicts a battery packaging apparatus constructed according to aspects of the present disclosure.

FIG. 8 depicts an embodiment of a battery packaging apparatus 24 constructed according to aspects of the present disclosure. A conductive strip 22 is electrically coupled to a plurality of cells 20 at the plurality of second terminals 21. An electrically conductive member 14 is electrically coupled to the plurality of cells 20s at a first terminals 23. Preferably, the plurality of cells 20 are spot welded to the electrically conductive member 14 at the plurality of first terminals 23. However, the electrically conductive member 14 may be attached in any way including adhesives, or stamped recesses in the electrically conductive member that are sized to fit the plurality of first terminals 23. Although the embodiment depicted in FIG. 8 uses a plurality of cells 20, different embodiments employ only one cell 20 in each row. Still further embodiments envision any number of cells 20 in the row as long as the plurality of cells maintain the connection schema described herein.

Figure 9:
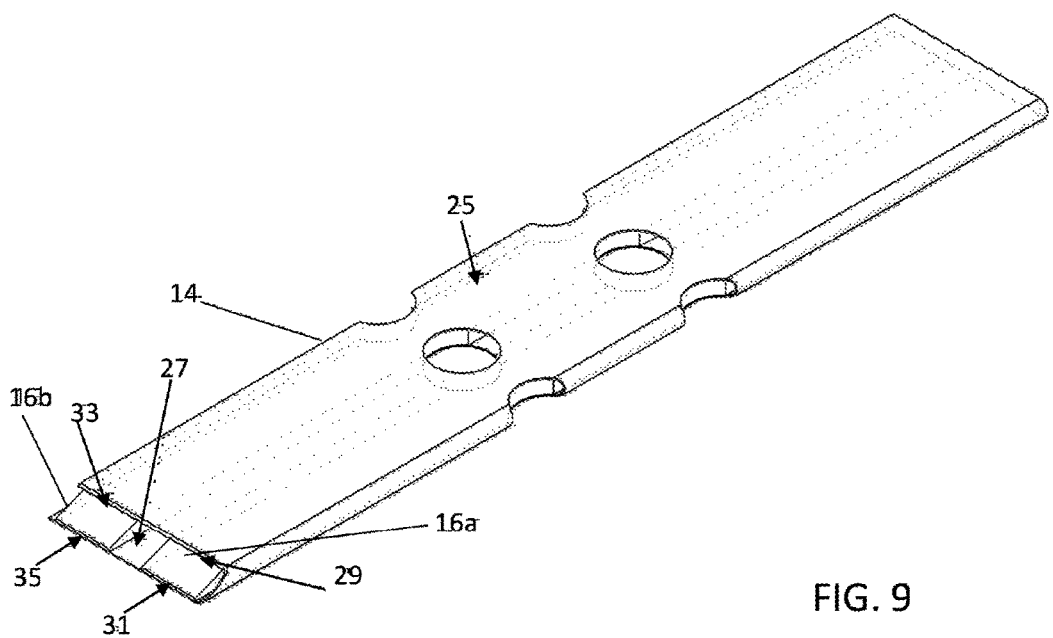
FIG. 9 depicts a cutaway view of an electrically conductive member constructed according to aspects of the present disclosure.

FIG. 9 depicts a cut away view of an electrically conductive member 14. The cut-away reveals a first spring element 16a and a second spring element 16b. The first spring element is coupled to the electrically conductive member 14 at a first area 29 and a second area 31. The second spring element 16a is coupled to the electrically conductive member at a third area 33 and a fourth area 35.

Referring to the electrically conductive member 14 in more detail, the electrically conductive member 14 has a first surface 25 and a second surface 27. In the depicted embodiment the electrically conductive member 14 is constructed from copper. However, any electrically conductive material will be suitable. In the embodiment depicted in FIG. 9 the electrically conductive member 14 has a 'U' shaped cross section. This shape enables efficient manufacturing by mechanical processes, however other embodiments have different cross sectional shapes. The limiting factor is that in embodiments with only one spring-like element the first area 29 is located approximately across from the second area 31. The limiting factor in embodiments with two spring-like elements is that the first area 29 is located approximately across from the second area 31 and that the third area 33 is approximately across from the fourth area 35. As long as these conditions are met a wide variety of cross sectional shapes are suitable.

Referring to the first spring-like element 16*a* in more detail, the first spring-like element 16*a* must be capable of providing a resistive force against the second face 27 when the first area 29 is translocated toward the second area 31 or vise-versa. In operation, this resistive force serves to maintain contact between the first surface 25 and the non-conductive board element 4. The first spring element 16*a* is coupled to the second surface 27 via adhesives, or mechanical fasteners. The first spring element 16*a* may be coupled at the first area 29 and the second area 31 or both.

Referring to the second spring element 16*b* in more detail, the second spring-like element 16*b* must be capable of providing a resistive force against the second face 27 when the third area 33 is translocated toward the fourth area 35, or vise-versa. In operation, this resistive force serves to maintain contact between the first surface 25 and the non-conductive board element 4. The second spring-like element 16*b* is coupled to the second surface 27 via adhesives, or mechanical fasteners. The second spring-like element 16*b* may be coupled at the second area 31 and the third area 35 or both.

Referring to spring-like elements 16 in more detail, the spring-like elements 16 may be constructed out of a wide range of materials. Depending on the mechanical and cost requirements of the battery application, different materials may be employed. For example, in one embodiment of the present disclosure, the spring-like element is made of spring steel for proven long term mechanical wear advantage. In another embodiment of the present disclosure, the spring-like element is made of beryllium copper for optimized heat transfer through the spring. In yet another embodiment of the present disclosure, the spring-like element is made of polyurethane globules deposited on the second surface. Other suitable materials include synthetic resins and adhesive-backed foam. Still further embodiments have more complex spring-like elements, where the spring-like elements is constructed from a self-resetting bi-metallic component. Additionally, in further embodiments, the first spring-like element 16*a* and second spring-like element 12*b* may be different areas of a single spring-like element.

Figure 10:
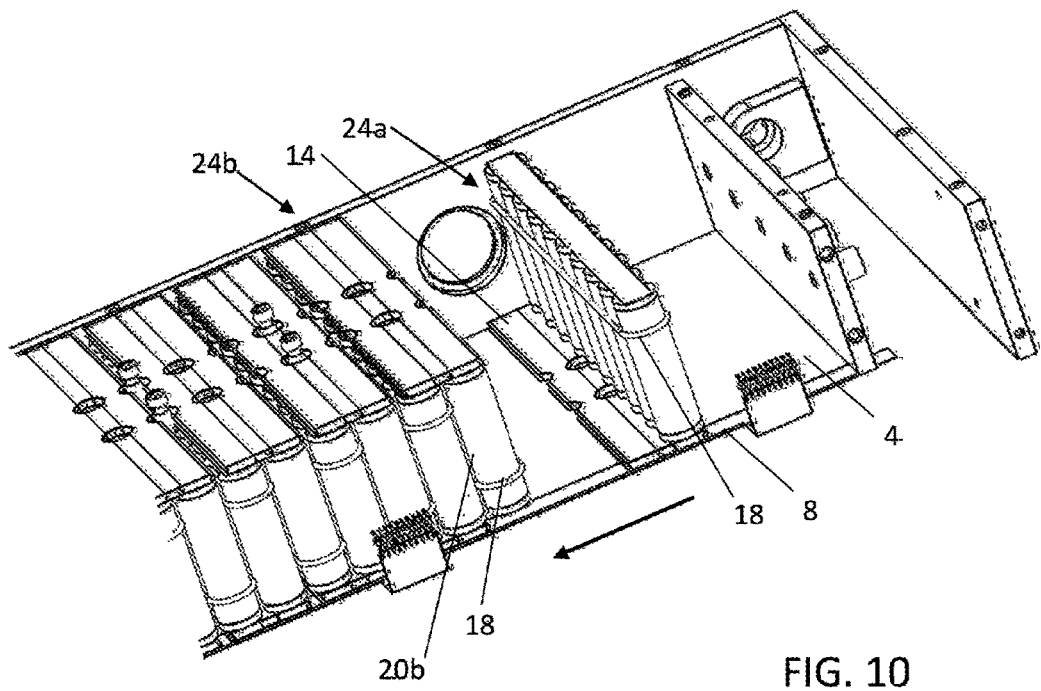
FIG. 10 depicts a partially assembled battery pack constructed according to aspects of the present disclosure.
Figure 11:
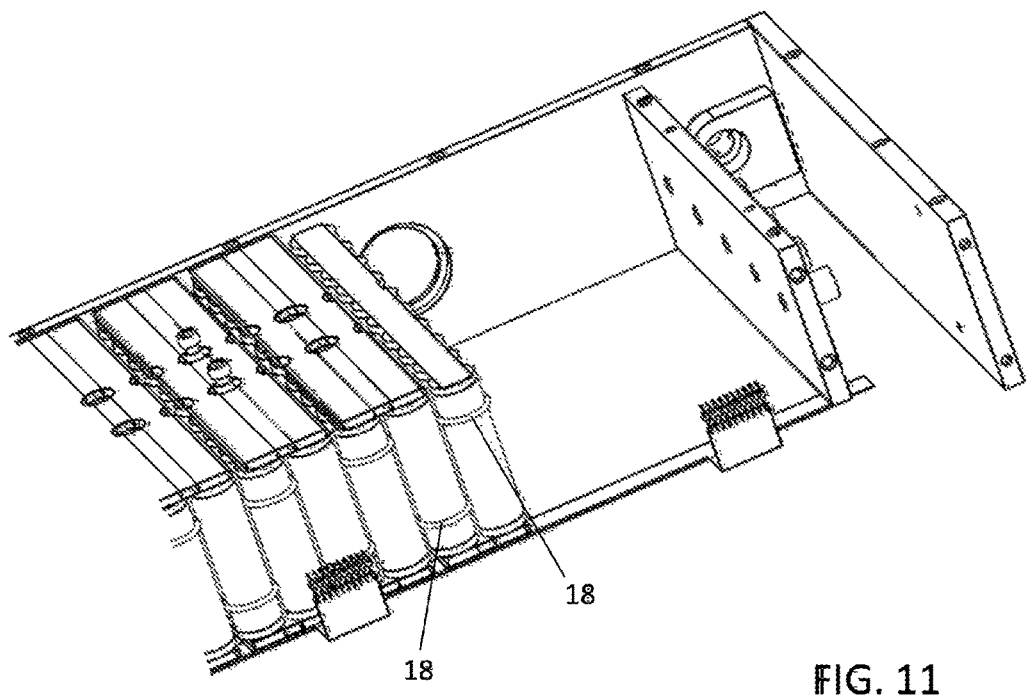
FIG. 11 depicts a partially assembled battery pack constructed according to aspects of the present disclosure.

The embodiment depicted in FIG. 8 simplifies the assembly of a large array of cells in series, such as in a battery pack 1. FIG. 10 and FIG. 11 show two stages of assembling a battery pack 1 with the embodiment depicted in FIG. 8. The battery packaging apparatus 24 holds the one or more cells 20 in place relative to one another and the electrically conductive member 14 and conductive strip 22 are coupled to the cells 20 as described above. FIG. 10 shows a previously installed battery packaging apparatus 24*b* and new battery packaging apparatus 24*a*. The new battery packaging apparatus 24*a* is placed in the housing 2 such that it rests on the non-conductive board element 4 and the flexible PCB 8. The new battery packaging apparatus 24*a* is moved in direction L until the electrically conductive member 14 from the new battery packaging apparatus 24*a* compress under the conductive strip 22 (not visible in FIG. 10) attached to cells in the previously installed battery packaging apparatus 24*b*. The bands 18 on the battery packaging apparatuses 24*a*, 24*b* ensure the correct spacing.

The new battery packaging apparatus 24*a* and the previously installed battery packaging apparatus 24*b* are both constructed in accordance with the embodiment in shown in FIG. 8. However, the new battery packaging apparatus 24*a* and the previously installed battery packaging apparatus 24*b* are oriented so that the respective electrically conductive members are located opposite one another. This alternating orientation is repeated until the final voltage for the battery pack 1 is reached.

Notably, in the embodiment of the present disclosure shown in FIG. 1, and as shown during assembly in FIG. 10 and FIG. 11, requires no wires to assembly. The plurality of cells used to power the battery pack 1 are fixed in a plurality of battery packaging apparatuses 24. During assembly the electrical coupling between a new battery packaging apparatus 24*a* and the previously installed battery packaging apparatus 24*b* is achieved by the electric coupling of the elongated member on the new battery packaging apparatus 24*a* and a conductive strip on the previously installed battery packaging apparatus 24*a*. The second spring element 16*b* provides a force on the second surface 27 as the electrically conductive member 14 is compressed during assembly. This force ensures an electric coupling between the electrically conductive member 14 on the new battery packaging apparatus 24*a* and the strip 22 on the previously installed battery packaging apparatus 24*b*.

Further, the battery management system 10 is electrically connected to the plurality of cells via traces 9 on a flexible PCB 8 that rests between the non-conductive board element 4 and the one or more electrically conducive member 14. The electric coupling between the traces 9 and the electrically conducive member 14 is achieved by the pressure applied between the electrically conductive member 14 and non-conducive board element.

Figure 13:
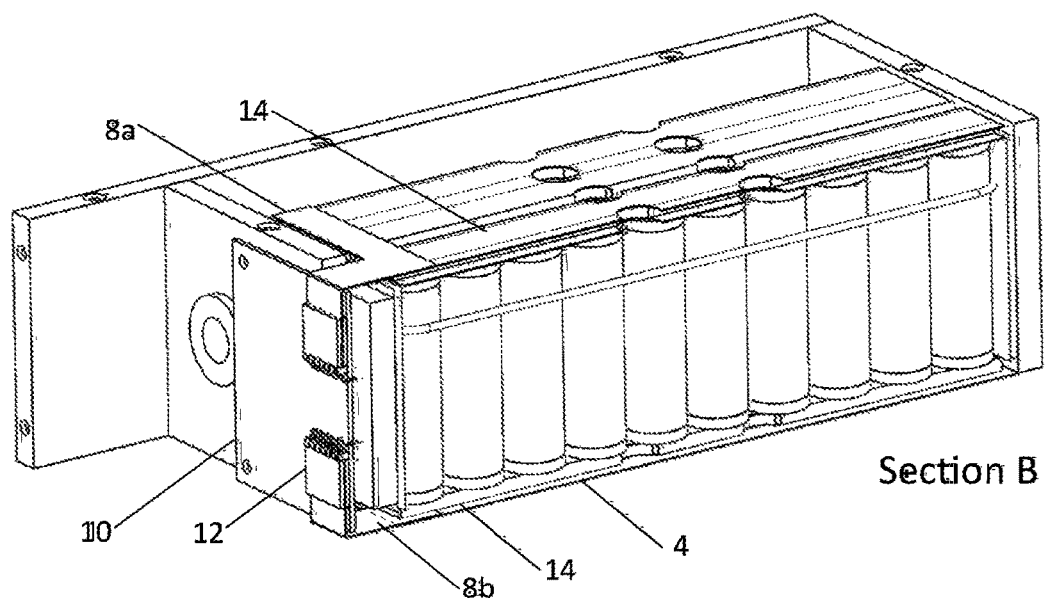
FIG. 13 depicts a cross section view of a battery pack constructed according to aspects of the present disclosure.

FIG. 13 is a section view at Section B of the embodiment of the present disclosure shown in FIG. 2. Readily apparent in FIG. 13 is a top flexible PCB 8*a* and a bottom flexible PCB 8*b*. In the embodiment shown in FIG. 13, the use of a top flexible PCB 8*a* and a bottom flexible PCB 8*b* and associated traces 9, enables the battery management system 10 to monitor the voltage across each row of cells in parallel. Additionally, FIG. 13 shows the non-conductive board member 4 and an electrically conductive member 14 compressed against the bottom flexible battery management system 8*b*. Although a top non-conductive board element is not shown (for clarity), in operation, a top non-conductive board element is used to compress the top flexible PCB 8*a* against a plurality of electrically conductive members 14.

Figure 14:
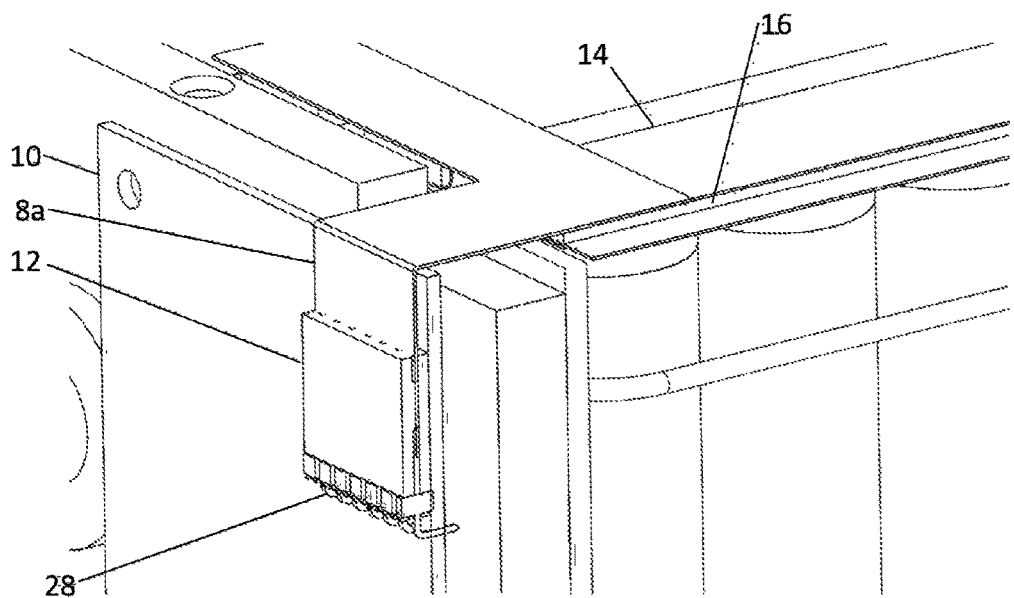
FIG. 14 depicts a detail view of the cross section view of a battery pack constructed according to aspects of the present disclosure shown in FIG. 13.

Referring to FIG. 14, FIG. 14 shows a detail view of the top flexible PCB 8*a*. The connector 12 in this embodiment uses a plurality of pins 28 which electrically couple the traces 9 (not shown in FIG. 14) on the top flexible PCB 8*a* to the battery management system 10. In further embodiments, the connector may be a plastic snap type connector or the bare ends of the traces 9 which would be suitable for soldering.

Figure 12:
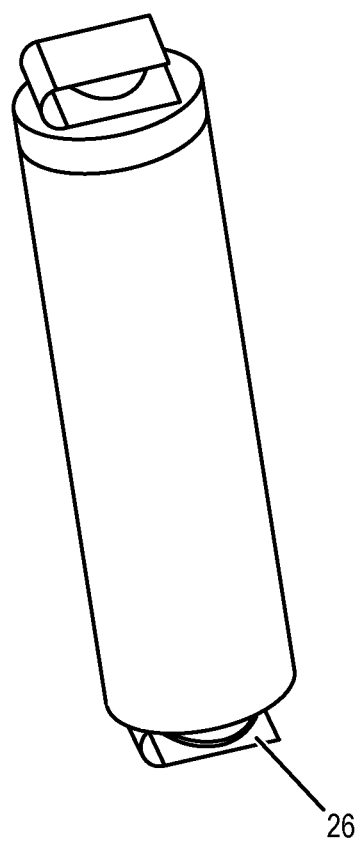
FIG. 12 depicts a battery packaging apparatus constructed according to aspects of the present disclosure.

FIG. 12 shows another embodiment of an aspect of the present disclosure. In the embodiment shown in FIG. 12, the electrically conductive element 26 is electrically coupled at the terminal of a cell 20. However, in this embodiment the electrically conductive element does not extend to contact cells in different rows. Rather, the combination of the spring-like elements 16 and electrically conductive element 26 provide a means for the electrical and thermal coupling of a cell within a housing of fixed dimensions such as found between 2 parallel non-conductive boards 4.

Figure 15:
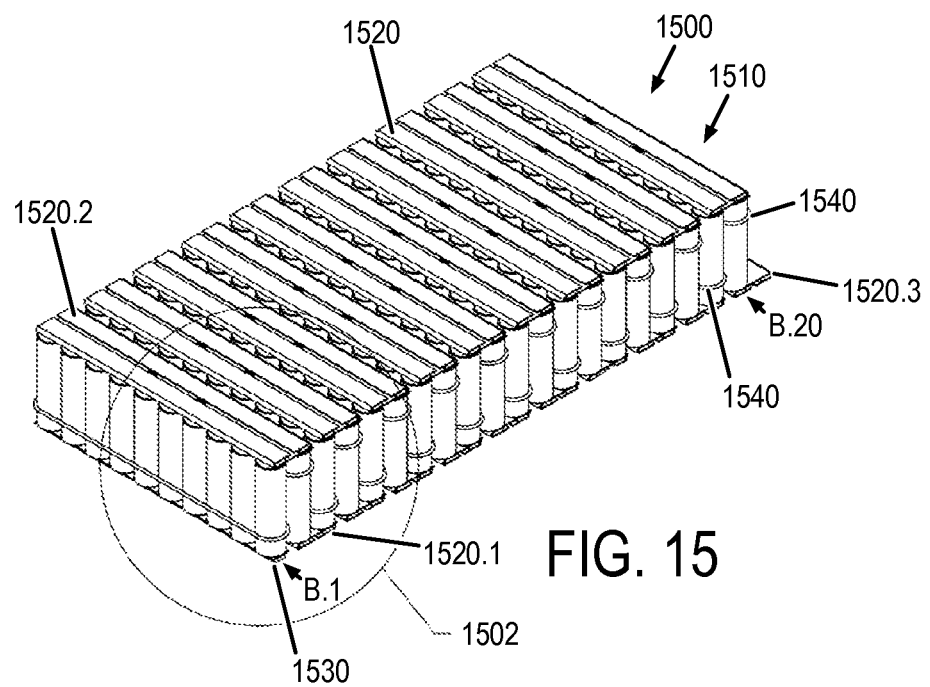
FIG. 15 depicts an example battery assembly.

FIG. 15 depicts an example battery assembly 1500. Battery assembly 1500 includes a plurality of interconnected batteries 1510 that are organized into rows. In this example, battery assembly 1500 includes twenty rows of batteries labeled sequentially as B.1-B.20. However, a battery assembly may include a different quantity of battery rows, such as one or more, two or more, three or more, ten or more, less than twenty, or greater than twenty rows of batteries.

Each row of batteries includes one or more batteries. In this example, each row of batteries includes ten batteries. An individual battery may be referred to herein as a battery cell or simply a cell. Each battery includes a positive terminal and a negative terminal. In this example, each battery takes the form of a cylinder in which positive and negative terminals are located on opposite ends of the cylinder. However, batteries may take other suitable forms.

Figure 16:
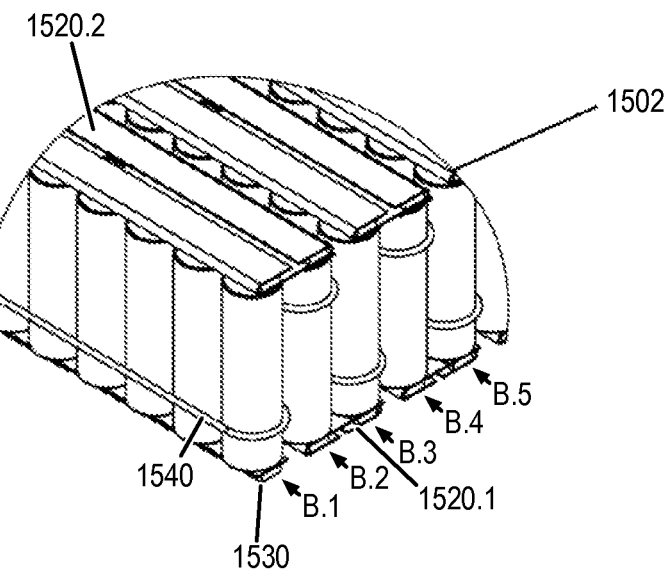
FIG. 16 depicts an enlarged view of a portion of the battery assembly of FIG. 15.
Figure 19:
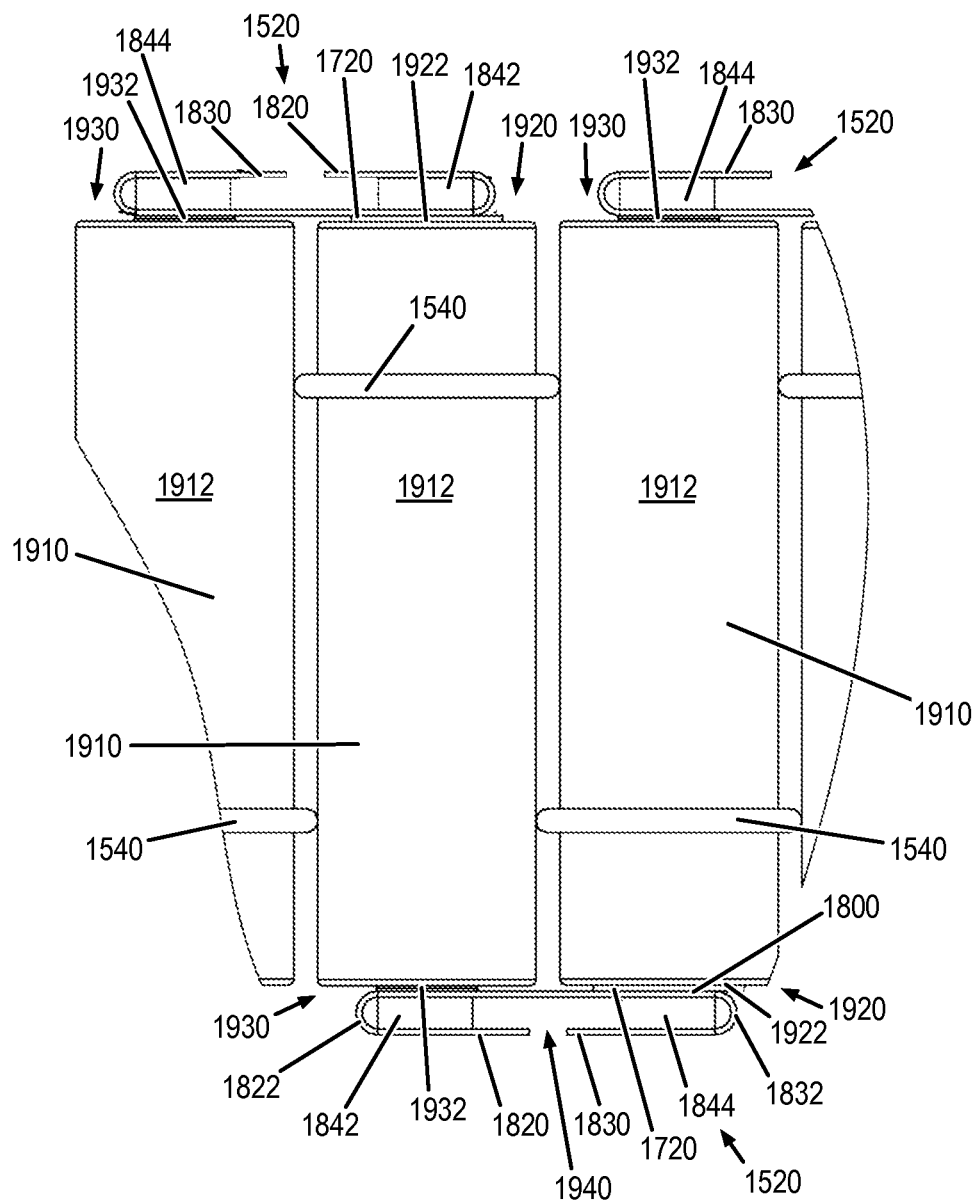
FIG. 19 depicts an enlarged view of a portion of the battery assembly of FIG. 15.

FIG. 19 depicts examples of individual batteries 1910 in further detail. Each battery 1910 includes a cylinder wall 1912, a first end 1920 that includes a negative terminal 1922, and a second end 1930 that includes a positive terminal 1932. Referring again to FIG. 15, the plurality of batteries 1510 of battery assembly 1500 are arranged in an array in which the batteries neighbor each other along their cylinder walls with the ends of the cylinders facing outward from the array along opposing parallel planes. FIG. 16 depicts an expanded view of a portion of FIG. 15 indicated at 1502. Individual rows of batteries may include one or more bands, such as band 1540. Band 1540 is a non-limiting example of previously described band 18.

In at least some implementations, batteries of an array may have different orientations relative to each other. As an example, each battery with a row may have the same orientation relative to each other battery of that row. Furthermore, a first set of battery rows may have a first orientation in which the negative terminal of each battery faces in a first direction and the positive terminal of each battery faces in a second direction that is opposite the first direction. A second set of battery rows may have a second orientation that differs from the first orientation in which the negative terminal of each battery faces in the second direction and the positive terminal of each battery faces in the first direction.

For example, neighboring rows of batteries may have different orientations relative to each other. In the examples depicted in FIGS. 15, 16, and 19 even-numbered battery rows labeled B.2, B.4, B.6, B.8, B.10, B.12, B.14, B.16, B.18, and B.20 have their negative terminals facing in a first direction, and odd-numbered battery rows labeled B.1, B.3, B.5, B.7, B.9, B.11, B.13, B.15, B.17, and B.19 have their negative terminals facing in a second direction that is opposite the first direction.

Figure 17:
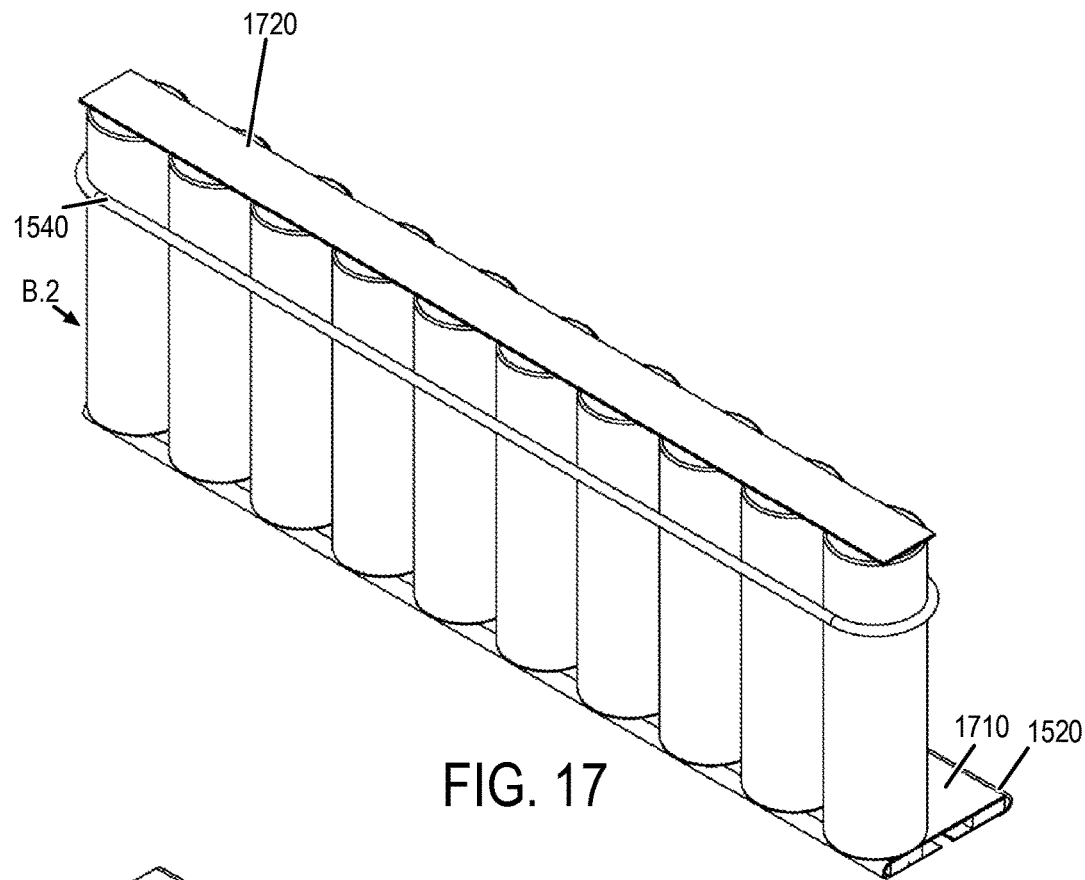
FIG. 17 depicts an individual row of batteries of an example battery assembly.
Figure 18:
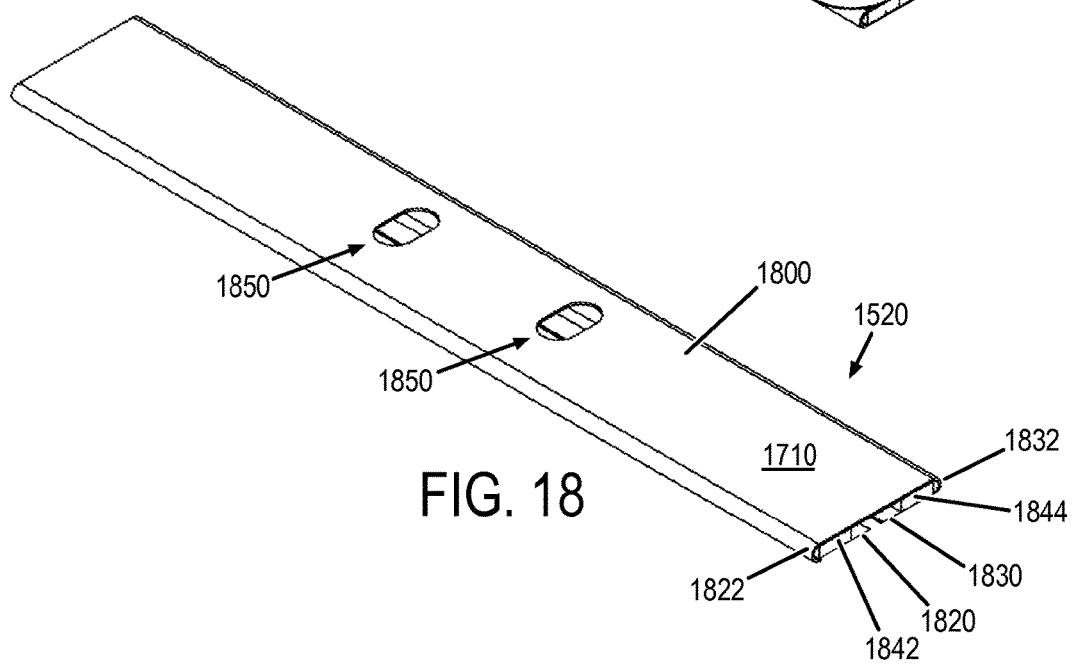
FIG. 18 depicts an example interconnection member that spans two rows of batteries of a battery assembly.
Figure 20:
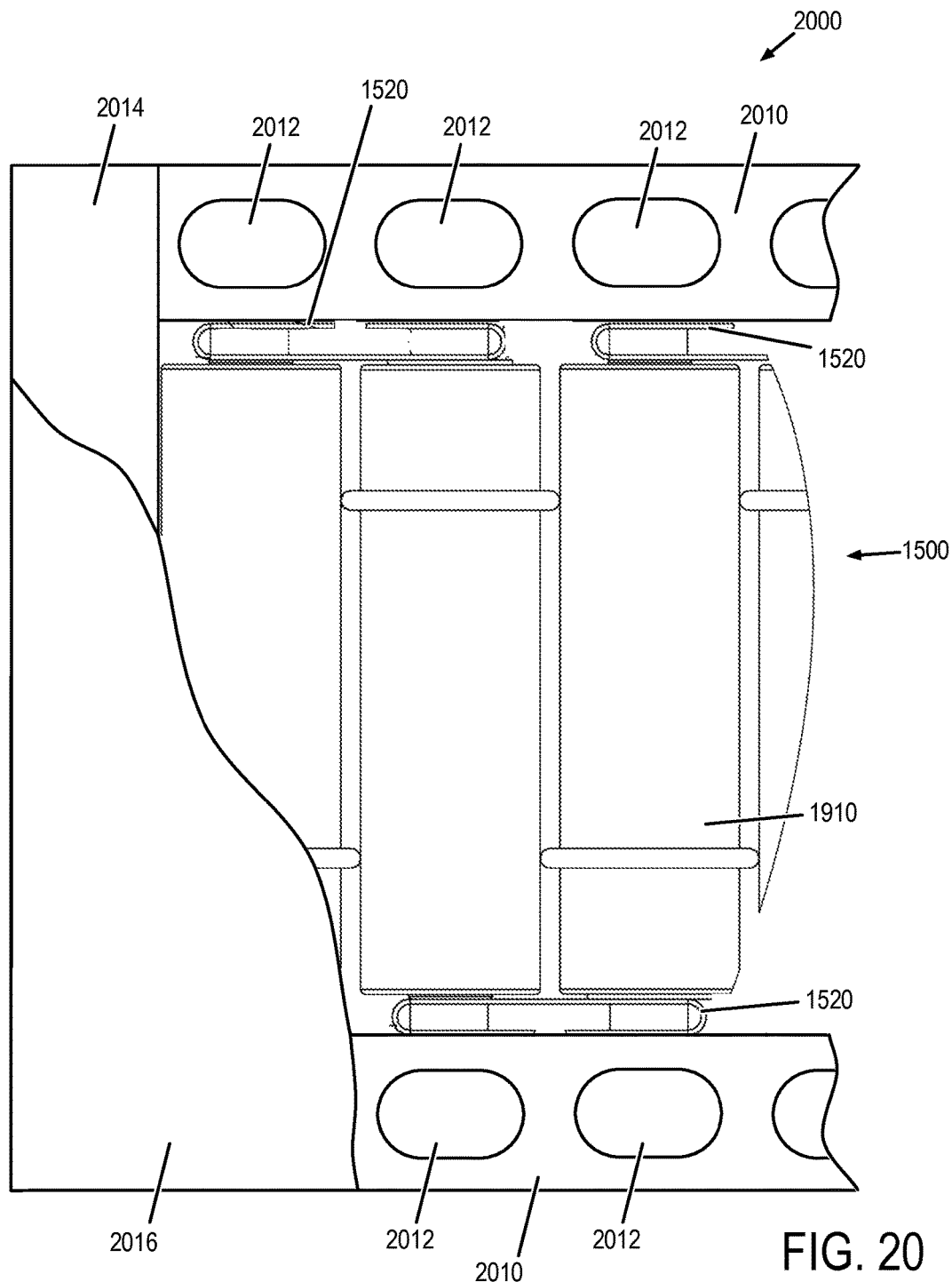
FIG. 20. depicts an example use-environment of the battery assembly of FIG. 15 within a battery enclosure.

Each battery row may be interconnected with its neighboring battery row(s) via one or more electrically conductive interconnection members. Multiple instances of an example interconnection member 1520 are depicted in FIGS. 15, 16, and 20. A detailed view of interconnection member 1520 is depicted in FIGS. 17 and 18. In this example, each instance of interconnection member 1520 spans each of the positive terminals or negative terminals of a battery row. Additionally, each instance of interconnection member 1520 spans the terminals of two neighboring battery rows on a particular side of the array.

Referring to FIG. 17, an example battery row (e.g., B.2) is depicted with the positive terminals of the batteries in electrical contact with a face 1710 of a first instance of interconnection member 1520.1. Because interconnection member 1520.1 is electrically conductive, each of the positive terminals of the battery row are interconnected with each other.

Referring again to FIG. 16, a neighboring battery row (e.g., B.3) is interconnected with battery row B.2 via interconnection member 1520.1. However, in this example, the negative terminals of battery row B.3 are in electrical contact with interconnection member 1520.1. Hence, interconnection member 1520.1 provides an electrical interconnection between the positive terminals of row B.2 and the negative terminals of row B.3.

Negative terminals of battery row B.2 are in electrical contact with a second instance of interconnection member 1520.2 located on an opposite side of the array. Positive terminals of neighboring battery row B.1 are also in electrical contact with interconnection member 1520.2. Hence, interconnection member 1520.2 provides an electrical interconnection among the negative terminals of row B.2 and further provides an electrical interconnection between the negative terminals of row B.2 and the positive terminals of row B.1.

Battery row B.2 is an example of an internal battery row that is bordered on each side by a neighboring battery row (e.g., B.1 and B.3). By contrast, battery row B.1 is an example of an edge battery row that is bordered on one side by a neighboring battery row, but is not bordered on an exterior side or edge by an interconnected battery row. For edge battery rows, an electrically conductive edge interconnection member 1530 may be optionally used to electrically interconnect each of the positive terminals or each of the negative terminals of an edge battery row. FIG. 16 depicts an instance of edge interconnection member 1530.1 in electrical contact with a negative terminal of battery row B.1. FIG. 15 depicts another edge battery row B.20 with its positive terminals electrically interconnected by an instance of interconnection member 1520.3 rather than an instance of an edge interconnection member 1530.

In at least some examples, an electrically conductive interconnection strip may be included between the negative terminals of the batteries of each battery row and the face 1710 of the interconnection member 1520 of that row. For example, FIG. 17 depicts an example electrically conductive interconnection strip 1720 that spans each negative terminal of battery row B.2. In some examples, strip 1720 may be omitted. Strip 1720 is a non-limiting example of previously described strip 22 of FIGS. 1-14.

Referring to FIG. 18, example interconnection member 1520 is depicted in further detail. Interconnection member 1520 includes a main portion 1800, a first wing portion 1820, and a second wing portion 1830. A face 1710 of main portion 1800 may be in electrical contact with a pair of neighboring battery rows as depicted in FIGS. 17 and 19, for example. In at least some examples, main portion 1800 may include one or more openings 1850 formed therein. Such openings may provide increased ventilation or circulation among the batteries and/or may reduce weight of the interconnection member. It will be understood that openings 1850 depicted in FIG. 18 are a non-limiting example of an opening shape, positioning, and quantity, as other suitable opening shapes, positioning, and/or quantity of openings may be used.

First wing portion 1820 joins main portion 1800 via a first interface portion 1822, and second wing portion 1830 joins main portion 1800 via a second interface portion 1832. First interface portion 1822 is located along a first edge of interconnection member 1520 and second interface portion 1832 is located along a second edge of interconnection member 1520 that opposes the first edge. In this example, interface portions 1822 and 1832 take the form of bends. In at least some examples, interconnection member 1520 may be formed from a single piece of material by bending wing portions 1820 and 1830 at interface portions 1822 and 1832. In another example, interconnection member 1520 may be formed from a single piece of material that is extruded along a length of the interconnection member parallel to the battery rows. However, in other examples, wing portions 1820 and 1830 may be separate pieces of material that are joined to main portion 1800 by welding, mechanical fasteners, adhesives, or other suitable technique. Typically, main portion 1800 and wing portions 1820 and 1830 are joined via interfaces 1822 and 1832 that provide electrical conductivity between the main portion and the wing portions. However, in other examples, the wing portions may be electrically insulated from the main portion of interconnection member 1520.

Interconnection member 1520 includes mechanically-elastic and/or spring-like elements 1842 and 1844 located between an internal facing surface (e.g., an opposite face of main portion 1800 that opposes face 1710) of main portion 1800 and internal facing surfaces of wings 1820 and 1830, respectively. Elements 1842 and 1844 may take the form of previously described spring elements 16. Accordingly, elements 1842 and 1844 may provide a spring-like force or mechanical response to compression of interconnection member 1520 in a direction that is orthogonal to surface 1710. The term spring-like does not necessarily require that elements 1842 and 1844 have a constant spring coefficient. However, in at least some examples, elements 1842 and 1844 have a constant or a substantially constant spring coefficient. Elements 1842 and 1844 may be electrically conductive in some examples. In other examples, elements 1842 and 1844 may be electrically non-conductive. In some examples elements 1842 and 1844 may be formed from a heat/temperature tolerant material that is rated to beyond a working temperature of the battery assembly under actual operating conditions. Elements 1842 and 1844 may be continuous along the length of interconnection member 1520 or may include a plurality of discrete elements that are spaced apart from each other at intervals along the length of interconnection member 1520.

FIG. 19 depicts a detailed view of interconnected batteries of neighboring rows with several instances of interconnection member 1520 as viewed along an axis that is parallel to each battery row and to the long axis of the interconnection member. In this view, FIG. 19 depicts a distal or terminal end of each of wings 1820 and 1830 being spaced apart from main portion 1800 to accommodate elements 1842 and 1844. The distal or terminal ends of each of wings 1820 and 1830 are separated from each other in this example by a gap 1940. Gap 1940 may provide additional openings for ventilation of the battery assembly and/or may enable independent compression and movement of wings 1820 and 1830 relative to main portion 1800. The section view of interconnection member 1520 depicted in FIG. 19 may be constant along an entire length of the interconnection member or may vary at locations along the length of the interconnection member. As an example, if openings (e.g., openings 1850) are formed in main portion 1800, then the interconnection member varies in section along its length with respect to the location of the openings. Also within FIG. 19, interconnection strip 1720 is depicted between the negative terminal 1922 and face 1710 of main portion 1800 for each interconnection member.

FIG. 20 depicts a non-limiting example of a use-environment for battery assembly 1500. In this example, battery assembly 1500 is located within an enclosure 2000. Enclosure 2000, in this example, takes the form of a three-dimensional volume that includes six-quadrilateral walls in which two instances of walls 2014 are parallel to and oppose each other, two instances walls 2016 are parallel to and oppose each other, and two instances of walls 2010 are parallel to and oppose each other to define a battery region within which battery assembly 1500 is contained or otherwise resides. In this example, fluid channels or pathways 2012 carrying a fluid (e.g., a liquid or gas working fluid as a coolant) are aligned with each battery row. Each fluid pathway 2012 may continue along an entire length of each interconnection member 1520. Instances of interconnection member 1520 are in thermal contact with walls 2010 at or in the vicinity of each of pathways 2012 to provide a thermal pathway between batteries and the fluid circulating through the pathways. Elements 1842 and 1844 may be in a compressed state when battery assembly 1500 is installed within enclosure 2000 to provide improve thermal transfer between the batteries and the enclosure walls and/or to provide increase electrical conductivity between the battery terminals and the interconnection members.

It will be understood that aspects of battery assembly 1500 may be used in combination with some or all of the previously described features of battery pack 1. The various materials and manufacturing techniques described with respect to a particular example may be used or applied to similar components of the various other examples disclosed herein. As an example, interconnection member 1520 may be used in place of conductive member 14 of FIGS. 1-14, or conductive member 14 may be used in place of interconnection member 1520 of FIGS. 15-20. As another example, battery 1910 is a non-limiting example of the previously described batteries or cells of FIGS. 1-14.

Specific apparatuses and methods relating to battery pack design have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It will be understood that the configurations and/or techniques described herein are exemplary in nature. Specific examples are not to be considered in a limiting sense, because numerous variations are possible. The subject matter of the present disclosure includes all novel and nonobvious combinations and subcombinations of the various configurations and techniques disclosed herein, as well as any and all equivalents thereof.

The invention claimed is:

1. A battery assembly, comprising:
   a plurality of batteries organized into an array that includes at least two neighboring rows of batteries, each battery including a negative terminal and a positive terminal facing outward along two opposing planes of the array;
an electrically conductive interconnection member in electrical contact with one of the negative terminal or positive terminal of each battery of the two neighboring rows of batteries within one of the two opposing planes of the array, the one of the negative terminal or positive terminal of each battery of the two neighboring rows in electrical contact with a face of a main portion of the interconnection member, the interconnection member further including:
a first wing joining the main portion along a first edge of the main portion in which a distal end of the first wing is spaced apart from an internal facing surface on an opposite side of the main portion from the face,
a second wing joining the main portion along a second edge of the main portion in which a distal end of the second wing is spaced apart from the internal facing surface of the main portion,
a first spring-like element located between an internal facing surface of the first wing and the internal facing surface of the main portion, and
a second spring-like element located between an internal facing surface of the second wing and the internal facing surface of the main portion:
wherein each battery of a first row of the at least two neighboring rows includes a negative terminal facing outward along a first plane of the two opposing planes of the array, the negative terminal of each battery of the first row being in electrical contact with the face of the main portion of the interconnection member; and
wherein each battery of a second row of the at least two neighboring rows that neighbors the first row includes a positive terminal facing outward along the first plane of the two opposing planes of the array, the positive terminal of each battery of the second row being in electrical contact with the face of the main portion of the interconnection member.

2. The battery assembly of claim 1, wherein the first row and the second row each include multiple batteries of an identical quantity relative to each other.

3. The battery assembly of claim 1, wherein the distal end of the first wing and the distal end of the second wing are spaced apart from each other to provide a gap between the first wing and the second wing along a length of the interconnection member;
wherein the length of the interconnection member is parallel to the first and the second rows of batteries.

4. The battery assembly of claim 1, wherein each battery of the first row is aligned with a first fluid pathway of an enclosure wall that interfaces with an external facing surface of the first wing, the first fluid pathway being parallel to the first row of batteries along a length of the interconnection member; and
wherein each battery of the second row is aligned with a second fluid pathway of the enclosure wall that interfaces with an external facing surface of the second wing, the second fluid pathway being parallel to the second row of batteries along the length of the interconnection member;
wherein the length of the interconnection member is parallel to the first and the second rows of batteries.

5. The battery assembly of claim 1, wherein the first spring-like element is one of a plurality of a first set of spring-like elements arranged along the length of the interconnection member between the internal facing surface of the first wing and the internal facing surface of the main portion;
wherein the second spring-like element is one of a plurality of a second set of spring-like elements arranged along the length of the interconnection member between the internal facing surface of the second wing and the internal facing surface of the main portion.

6. The battery assembly of claim 5, wherein the first row of batteries is aligned with the first set of spring-like elements; and
wherein the second row of batteries is aligned with the second set of spring-like elements.

7. The battery assembly of claim 1, wherein the first spring-like element is a first continuous spring-like element that spans at least a portion of the length of the interconnection member that interfaces with two or more batteries of the first row; and
wherein the second spring-like element is a second continuous spring-like element that spans at least a portion of the length of the interconnection member that interfaces with two or more batteries of the second row.

8. The battery assembly of claim 1, wherein the plurality of batteries of the array includes at least a third row of batteries that neighbors the second row of batteries, each battery of the third row including a negative terminal facing outward along the first plane of the two opposing planes of the array, and each battery of the third row including a positive terminal facing outward along a second plane of the two opposing planes of the array; and
wherein each battery of the second row includes a negative terminal facing outward along the second plane.

9. The battery assembly of claim 8, further comprising a second electrically conductive interconnection member including:
a second main portion having a second face that is in electrical contact with the negative terminals of the second row of batteries and the positive terminals of the third row of batteries,
a third wing joining the second main portion along a first edge of the second main portion in which a distal end of the third wing is spaced apart from an internal facing surface on an opposite side of the second main portion from the second face,
a fourth wing joining the second main portion along a second edge of the second main portion in which a distal end of the fourth wing is spaced apart from the internal facing surface of the second main portion,
a third spring-like element located between an internal facing surface of the third wing and the internal facing surface of the second main portion, and
a fourth spring-like element located between an internal facing surface of the fourth wing and the internal facing surface of the second main portion.

10. The battery assembly of claim 1, further comprising an electrically conductive interconnection strip that spans each negative terminal of the first row of batteries, the interconnection strip disposed between the interconnection member and each negative terminal of the first row of batteries;
wherein each negative terminal of the first row of batteries is in electrical contact with the interconnection member via the interconnection strip.

11. The battery assembly of claim 1, wherein the first spring-like element and the second spring-like element are electrically conductive.

12. The battery assembly of claim 1, wherein the first spring-like element and the second spring-like element are electrically non-conductive.

13. The battery assembly of claim 1, wherein the first spring-like element and the second spring-like element are each formed of spring steel.

14. The battery assembly of claim 1, wherein the first spring-like element and the second spring-like element are each formed of polyurethane.

* * * * *